(12) United States Patent
Iwaki

(10) Patent No.: US 6,898,300 B1
(45) Date of Patent: May 24, 2005

(54) IMAGE PROCESSING METHOD AND APPARATUS

(75) Inventor: Yasuharu Iwaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 861 days.

(21) Appl. No.: 09/698,142

(22) Filed: Oct. 30, 2000

(30) Foreign Application Priority Data

Oct. 29, 1999 (JP) .......................................... 11-307995

(51) Int. Cl.[7] .............................. G06K 9/00; A61B 3/14
(52) U.S. Cl. ...................................... 382/117; 351/206
(58) Field of Search ................... 382/117–118; 351/161, 351/206, 208–210; 428/195.1

(56) References Cited

U.S. PATENT DOCUMENTS 4,486,080 A * 12/1984 Itoh et al. .................... 351/206
5,266,381 A * 11/1993 Simon ....................... 428/195.1
5,570,151 A * 10/1996 Terunuma et al. ............. 396/52
5,878,156 A *  3/1999 Okumura .................... 382/118
5,905,563 A *  5/1999 Yamamoto .................. 351/210
6,092,899 A *  7/2000 Wanders ..................... 351/161
6,433,899 B1 *  8/2002 Anslow et al. ................. 398/5

* cited by examiner

*Primary Examiner*—Kanjibhai Patel
(74) *Attorney, Agent, or Firm*—Sughrue Mion, PLLC

(57) ABSTRACT

The image processing method and apparatus perform preset image processing on input image data and outputting processed image data as output image data. In the method and apparatus, the present image processing includes eye correction processing for correcting a closed eye image in a human image having an eye in a closed state into an eye image in an open state. The method and apparatus are capable of performing eye opening processing on a human image having an eye being closed, correcting a failure created at the time of shooting and then outputting the image having the eye being open.

21 Claims, 7 Drawing Sheets

TO EYE IMAGE CONVERTING SUBSECTION 62

IMAGE PROCESSING METHOD AND APPARATUS

BACKGROUND OF THE INVENTION

This invention relates to image processing method and apparatus for correcting a face image of a person having an eye being closed into the face image having the eye being open and outputting the thus corrected face image.

In photographing, a photograph having an eye being closed may in some cases be produced by blinking at the moment of shooting, or closing the eye when shot with an electronic flash and the like. Particularly in the case of a portrait photograph, the eye is an important element so that the photograph having an eye being closed is unfavorable in quality. Such a photograph may cause no problem if a retake is allowed; however, it is desirous to correct a failure created at shooting, if the retake is hardly allowed. To cope with the above-described problem, conventionally, a correction by retouch has been performed using a pen by a skilled person.

However, since the above-described conventional correction method by retouch using a pen depends on a manual operation of a skilled operator, correction work requires labor and time; hence, a problem that a photograph cost is increased is derived.

SUMMARY OF THE INVENTION

The present invention has been accomplished under these circumstances and has as an object providing an image processing method which is capable of performing eye opening processing on a human image having an eye being closed, correcting a failure created at the time of shooting and then outputting the image having the eye being open and an apparatus using the above-described method.

In order to attain the above-described object, the present invention provides an image processing method, comprising the steps of performing preset image processing on input image data and outputting processed image data as output image data, wherein the preset image processing includes eye correction processing for correcting a closed eye image in a human image having an eye in a closed state into an eye image in an open state.

Preferably, the eye correction processing is composite processing for compositing an open eye image of a same person on the closed eye image.

Preferably, the eye correction processing is composite processing for compositing an open eye image of a person other than a same person to the closed eye image.

Preferably, the eye correction processing is composite processing for compositing on the closed eye an eye image selected from a plurality of samples of open eye images which have preliminarily been prepared.

Preferably, the composite processing comprises a step of adjusting a size and angle of the eye, colors and densities of an eyelid, a pupil and neighbor of the eye in an image to composite so as to conform to those in an image to be composited.

Preferably, the adjusting step is performed automatically based on one or more characteristics of image characteristics of the image to be composited including a color and density of the neighbor of the eye, a position of each eye, a distance between both eyes, a size of the eye and a size of a face.

Preferably, the adjusting step is performed manually by an operator based on a menu which changes a size, angle, color, density and aspect ratio of the eye of the image to composite.

Preferably, the eye correction processing is performed by the steps of comparing the eye image in the closed state and the eye image in the open state with each other, assuming movement of a point on an eyelid based on a characteristic of a shape of the eye image, and opening a closed eye based on the thus assumed movement.

Preferably, the eye correction processing comprises the steps of setting the eye image in the closed state as an input signal, setting the eye image in the open state as a teacher signal, learning an image conversion from a closed eye to a open eye, and opening the closed eye based on the thus learned image conversion.

Preferably, a degree of opening the closed eye is adjustable in the eye correction processing.

Preferably, the eye image in the closed state is adjustable into the eye image in a predetermined open state by specifying a length of eyelashes, a direction of the eyelashes, a single-edged eyelid or a double-edged eyelid.

Preferably, the eye correction processing further comprises a retouch function.

Preferably, the eye correction processing in correcting the closed eye image when only one eye is closed utilizes characteristics of open eye and neighbor thereof.

Preferably, as the characteristics of the neighbor, at least one or more information of a color and size of a pupil, a length of eyelashes, a color of skin of an eyelid and the neighbor of the eye, a single-edged eyelid or a double-edged eyelid, a position of the eye and the size and shape of the eye are utilized.

Preferably, the position or a shape of a pupil can be changed to be capable of adjusting a line of vision by both eyes.

There is provided an image processing apparatus for receiving image data from an image input device, performing preset image processing on the inputted image data and outputting processed image data as output image data to an image output device, comprising an eye correction processing device which corrects a closed eye image in a human image having an eye in a closed state into an eye image in an open state.

Preferably, the image processing apparatus described above further comprises an image display device, which controls such that an enlarged image of a neighbor of the eye can be displayed on the image display device while the eye correction processing device performs the eye correction processing for opening a closed eye.

DETAILED DESCRIPTION OF THE INVENTION

Image processing method and apparatus according to the present invention are now described in detail with reference to the preferred embodiments shown in the accompanying drawings.

Figure 1:
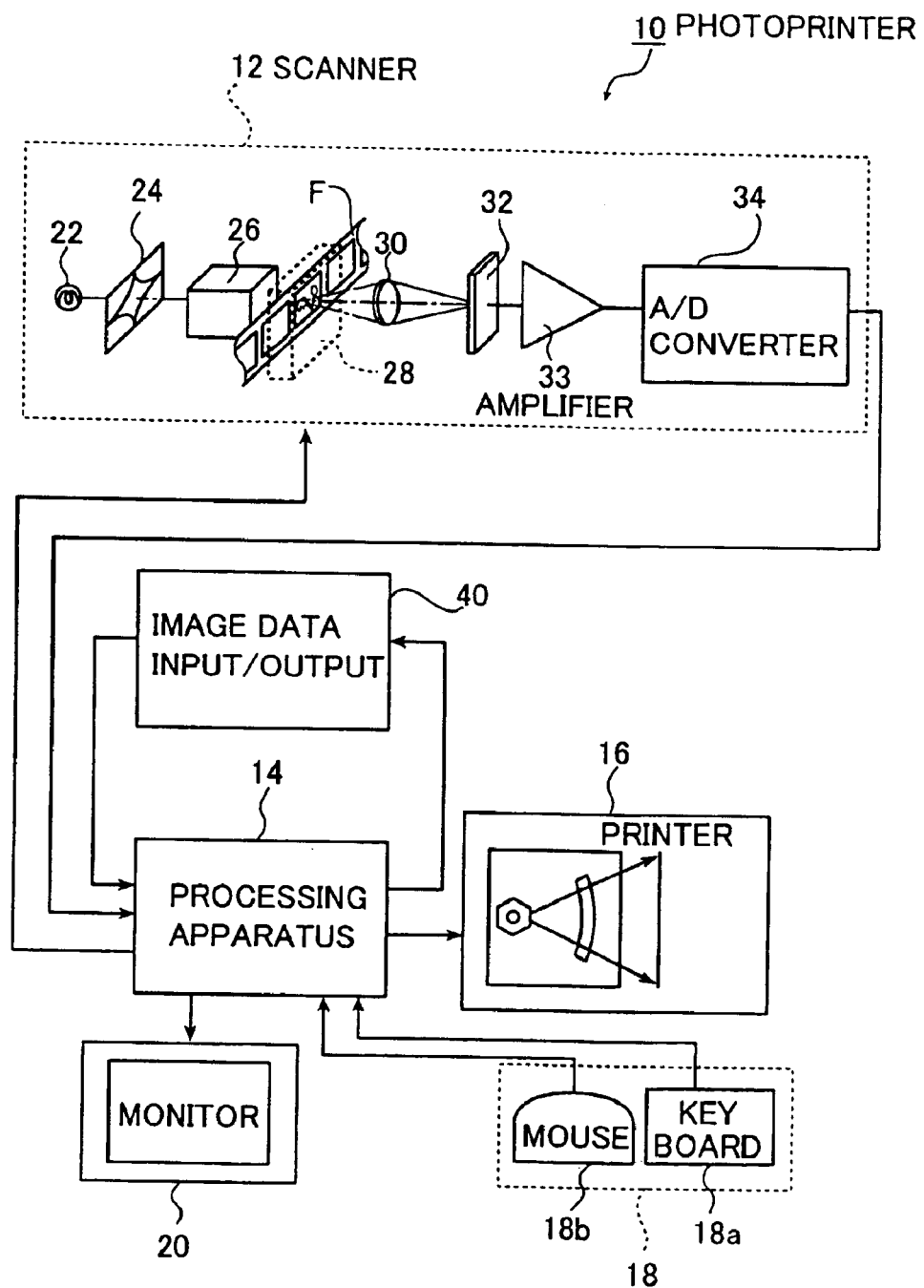
FIG. 1 is a block diagram of an embodiment of a digital photoprinter using an image processing apparatus which executes an image processing method according to the present invention.

FIG. 1 is a block diagram of an embodiment of a digital photoprinter using the image processing apparatus executing the image processing method according to the present invention.

The digital photoprinter (hereinafter referred to simply as "photoprinter") 10 shown in FIG. 1 comprises basically a scanner (image reading apparatus) 12 for photoelectrically reading an image recorded on a film F, an image processing apparatus 14 which performs image processing on image data (image information) thus read by the scanner 12 and with which the photoprinter 10 as a whole is manipulated and controlled, and an image recording apparatus (printer) 16 which performs imagewise exposure of a light-sensitive material (photographic paper) with light beams modulated in accordance with the image data delivered from the image processing apparatus 14 and which performs development and other necessary processing to produce a (finished) image as a print.

Connected to the image processing apparatus 14 are a manipulating unit 18 having a keyboard 18a and a mouse 18b for inputting and setting various conditions, selecting and commanding a specific processing step and entering a command and so forth for effecting color/density correction, as well as a monitor 20 for displaying the image captured with the scanner 12 and various manipulative commands and pictures for setting, registering various conditions and then verifying the displayed image by an operator while the operator is looking at the monitor 20.

The image processing apparatus 14 may be connected to an image data input/output device 40 such as a recording/replaying device of image data from media, an image data distributing or delivering device via a communication device such as a communication network and the like whereby the image data may be inputted thereto through the image data input/output device 40 or it may output the image data to the image data input/output device 40.

The scanner 12 is an apparatus with which the images recorded on the film F or the like are read photoelectrically frame by frame. It comprises a light source 22, a variable diaphragm 24, a diffusion box 26 which diffuses the reading light incident on the film F so that it becomes uniform across the plane of the film F, a carrier 28 for the film F, an imaging lens unit 30, an image sensor 32 having a 3-line CCD sensor capable of reading each color image density of R (red), G (green) and B (blue) images, an amplifier (Amp) 33 and an A/D (analog/digital) converter 34.

In the photoprinter 10, dedicated carriers 28 are available that can be loaded into the body of the scanner 12 in accordance with the type or the size of the film F used (e.g. whether it is a film of the Advanced Photo System (APS) or a negative or reversal film of 135 size), the format of the film (e.g. whether it is a strip or a slide) or other factor. By replacing the carriers 28 from one to another, the photoprinter 10 can be adapted to process various kinds of films in various modes. The images (frames) that are recorded on the film and which are subjected to the necessary procedure for print production are transported to and held in a specified reading position by means of the carriers 28.

As is well known, magnetic recording media are preliminarily formed on the APS film to record a cartridge ID, a film kind and the like. In addition, various types of information such as date and time of taking pictures or development, kind of a camera or a developing machine and the like can be recorded at the time of taking pictures or development. In the carrier 28 corresponding to the APS film (cartridge), a device for reading these magnetic information is provided whereby the magnetic information are read when the film is transported to the reading position and the thus read various types of information are sent to the image processing apparatus 14.

The scanner 12 captures the images recorded on the film F in the following manner; the reading light from the light source 22 has its quantity adjusted by means of the variable diaphragm 24 and the diffusion box 26 and is incident on the film F held in the specified reading position by means of the carrier 28 and thereafter passes through the film to produce projected light bearing the image recorded on the film F.

A color image signal is not limited to a type which is inputted by reading such light which passes through the film but a reflection original or an image taken by a digital camera may be usable. Moreover, the signal may be inputted by the image data input/output device 40 via the media, network and the like.

The illustrated carrier 28 is adapted to handle a lengthy film F (or in strips) of a cartridge or the like of a 135 size with 24 exposures or APS (or their cartridge) and transports the film F in an auxiliary direction which is perpendicular to the main scanning direction (i.e., the direction in which, for example, the 3-line CCD sensor of R, G and B in the image sensor 32 extends), with its length being parallel to the auxiliary scanning direction as it is in registry with the predetermined reading position.

Being held in registry with the reading position, the film F is transported in the auxiliary scanning direction by means of the carrier 28 as it is illuminated with the reading light. The reading light is regulated by the slit extending in the main scanning direction; consequently, the film F is subjected to two-dimensional scan to capture the image of each frame recorded on the film F.

Projected light from the film F is focused on a light-receiving plane of the image sensor 32 by the imaging lens unit 30.

The image sensor 32 is the so-called 3-line color CCD sensor comprising line CCD sensors for reading an R image, a G image and a B image, respectively. As already mentioned, each line CCD sensor extends in the main scanning direction. The projected light from the film F is separated into three primary colors R, G and B which are then photoelectrically captured by means of the above-described image sensor 32.

Respective output signals of R, G and B from the image sensor 32 are amplified with Amp 33, sent to the A/D converter 34, converted to respective digital image data of R, G and B, for example, in 12-bit form in the A/D converter 34 and then sent to the image processing apparatus 14.

In the scanner 12, the images recorded on the film F are captured by two scans: prescan for reading the image at low resolution (a first image reading) and fine scan for obtaining output image data (a second image reading).

Prescan is performed under a preset prescan reading condition that ensures that all the images on the film F to be handled by the scanner 12 can be read without saturating the image sensor 32.

On the other hand, fine scan uses the prescanned data and is performed under a reading condition that is set for each frame such that the image sensor 32 is saturated at a slightly lower density than the minimum density of the image (frame) of interest. The output image signals for prescan and fine scan are essentially the same image data with each other except for resolution and output image signal levels.

It should be noted that the scanner 12 to be used in the photoprinter 10 is by no means limited to a type that relies upon the slit scan technique described above but that it may be of a type that relies upon areal exposure, or a technique by which the image in one frame is scanned across at a time.

In this alternative approach, an area sensor such as an area CCD sensor and the like may be used with a device of inserting each of R, G and B color filters between the light source 22 and the film F. Each color filter is inserted in an optical path of injected light from the light source 22. Reading light produced by allowing the injected light to pass through the color filter illuminates a whole area of the film F. The transmitted light produced by allowing the reading light to pass through the film F is focused on the area CCD sensor to capture a whole image on a film in one frame. Such image capturing is performed by separating the image recorded on the film F into three primary colors as R, G and B color filters are sequentially inserted.

As already mentioned, the digital image signals outputted from the scanner 12 are fed into the image processing apparatus 14 which executes the image processing method according to the present invention.

Figure 2:
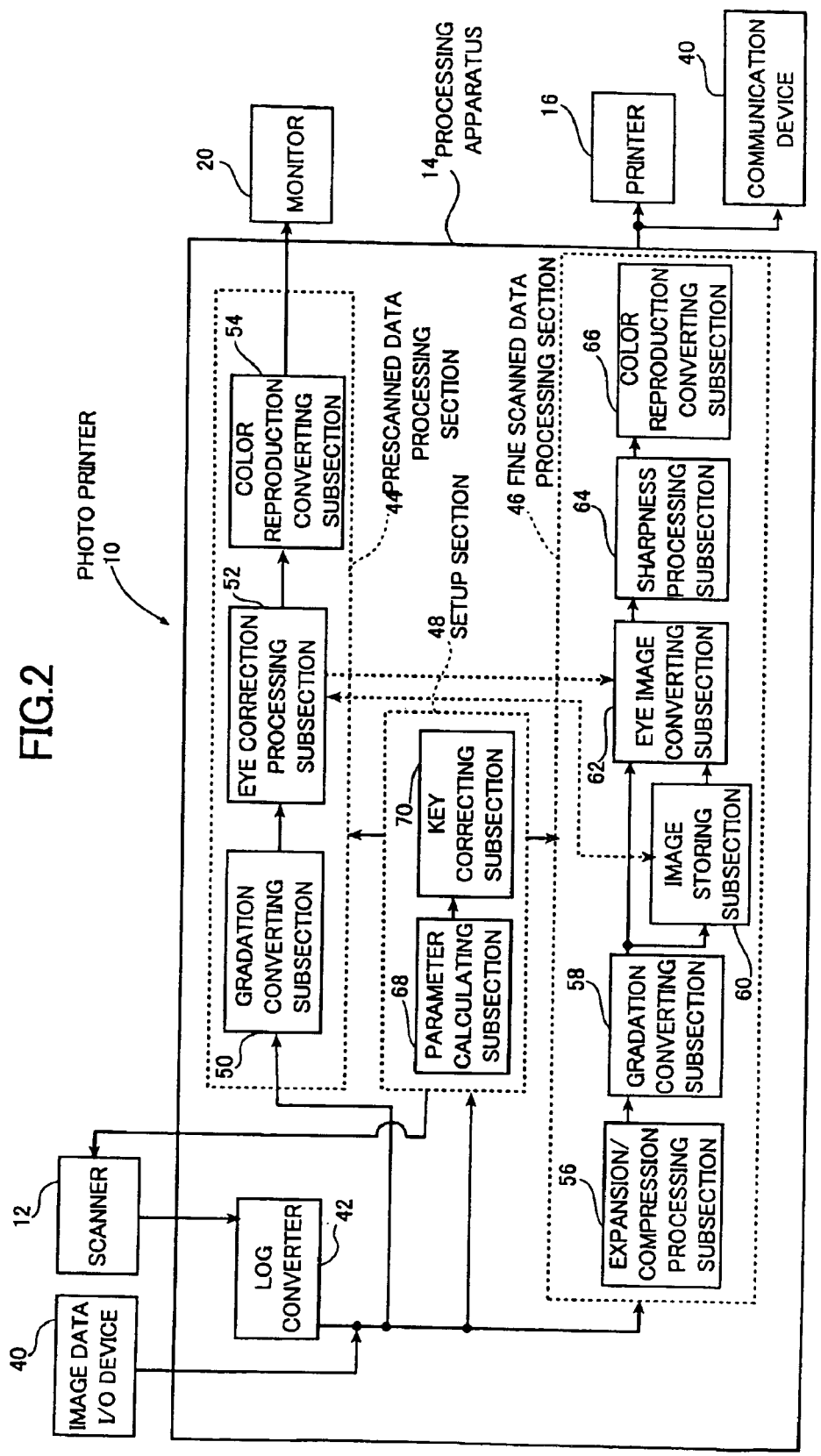
FIG. 2 is a block diagram schematically showing an embodiment of the image processing apparatus of the digital photoprinter shown in FIG. 1.

FIG. 2 is a block diagram of the image processing apparatus (which is hereinafter referred to as "processing apparatus") 14.

The processing apparatus 14 basically comprises a log converter 42, a prescanned data processing section 44, a fine scanned data processing section 46 and a setup section 48.

FIG. 2 shows only the sites related to image processing and besides these sites, the processing apparatus 14 includes a CPU for controlling and managing the overall operation of the photoprinter 10 including the processing apparatus 14, memories for storing the information necessary for the operation and otherwise of the photoprinter 10. The manipulating unit 18 and the monitor 20 are connected to related sites via the CPU and the like (CPU bus).

The R, G and B image signals inputted into the processing apparatus 14 from the scanner 12 are subjected to read image data correction such as DC offset correction, dark correction, defective pixel correction, shading correction and the like, if necessary, and then inputted into the LOG converter 42.

The LOG converter 42 performs log conversion processing using a look-up table (LUT) by which the digital image data are converted gradationwise into digital image density data.

The prescanned data and fine scanned data which have been converted into digital image density data by the LOG converter 42 are stored in respective memories.

The prescanned image data is read into the prescanned data processing section 44 and the fine scanned image data is read into the fine scanned data processing section 46.

It should be noted that image data can be inputted into the processing apparatus 14 from the image data input/output device 40 via the media, network and the like.

The prescanned data processing section 44, which is a site to subject the prescanned image data to various image processing necessary for being displayed on the monitor 20, comprises a gradation converting subsection 50, an eye correction processing subsection 52 and a color reproduction converting subsection 54.

The gradation converting subsection 50 performs predetermined image processing such as color conversion, density conversion, gradation correction and the like by the look-up table (hereinafter represented by "LUT"), a matrix (hereinafter represented by "MTX") operation on the image data read by the scanner 12 in accordance with an image processing condition set by the setup section 48 to be described below such that the thus read image data can be reproduced as color image having a desired quality on a CRT display screen of the monitor 20 to be described below.

The eye correction processing subsection 52 performs eye correction processing for opening a closed eye on the image to be displayed on the monitor screen. The color reproduction converting subsection 54 thins the image data to be displayed on the monitor screen which has been subjected to the image processing in order to agree with resolution of the monitor 20 if necessary and converts it into the image data corresponding to the display on the monitor 20 using a 3D—(three-dimensional) LUT and the like to allow the resultant image data to be displayed on the monitor 20.

The processing condition in the gradation converting subsection 50 is set by the setup section 48 to be described below.

On the other hand, the fine scanned data processing section 46, which is a site to subject the fine scanned image data to various image processing necessary for being outputted as a color print from the image recording apparatus (printer) 16, processing for opening a closed eye according to the present invention and other necessary image processing, comprises a expansion/compression processing subsection 56, a gradation converting subsection 58, an image storing subsection 60, an eye image converting subsection 62, a sharpness processing subsection 64 and a color reproduction converting subsection 66.

The expansion/compression processing subsection 56 performs expansion/compression processing on an input image in accordance with an image output device; the gradation converting subsection 58 converts gradations of color and density of the image data; the image storing subsection 60 stores an image having an eye being open for use in eye image conversion processing. The eye image converting subsection 62 converts an image having an eye in a closed state to the image having the eye in an open state as an image for outputting based on data of the eye correction processing performed in the prescanned data processing section 44.

The sharpness processing subsection 64 enhances an edge of the image to sharpen the image; the color reproduction converting subsection 66 converts the image data subjected to various types of image processing into image data corresponding to image recording by the printer 16, or image data recording to the media and/or image data delivering via the communication network by the image data input/output device 40 using, for example, the 3D-LUT and the like.

An image processing condition to be executed in the fine scanned data processing section 46 is set in the setup section 48.

The setup section 48, which sets various types of image processing conditions to be used in the fine scanned data processing section 46, comprises a parameter calculating subsection 68 and a key correcting subsection 70.

Further, the setup section 48 sets a reading condition of the fine scan using the prescanned image data and the like, supplies the thus set reading condition to the scanner 12 and also produces (calculates) image processing conditions to be used in the prescanned data processing section 44 and the fine scanned data processing section 46.

Specifically, the parameter calculating subsection 68 constructs a density histogram, calculates image characteristic quantities such as average density, LATD (large area transmission density), high light (lowest density), shadow (highest density) and the like from the prescanned image data.

From the thus calculated image characteristic quantities, reading conditions of fine scan such as a light quantity of the light source 22, a stop-down value of the variable diaphragm 24, a storage time of the image sensor 32 and the like are set such that the image sensor 32 is saturated at a slightly lower density than the minimum density of the image of interest. It should be noted that, in the reading conditions of fine scan, all factors corresponding to output levels of the image sensor relative to the reading conditions of prescan, at least one factor such as the stop-down value or the like or a plurality of factors such as the stop-down value, the storage time and the like may be changed.

The parameter calculating subsection 68 sets the image processing conditions such as the above-described color balance adjustment, gradation adjustment and the like, in accordance with the density histogram, the image characteristic quantities and the commands optionally entered by the operator and the like.

The key correcting subsection 70 calculates adjustment quantities of the image processing conditions (e.g. the correction quantities of LUT and the like) in accordance with the adjustment quantities such as density (brightness), color, contrast, sharpness, saturation and so forth that have been set by keys (not shown) provided in the keyboard 18$a$ or manipulating unit 18 or various commands entered by the mouse 18$b$ thereby setting parameters.

The thus set parameters representing the image processing conditions are sent to the prescanned data processing section 44 and the fine scanned data processing section 46. Further, in accordance with the adjustment quantities calculated by the key correcting subsection 70, the image processing conditions set in various parts are corrected (adjusted) or another setting of image processing conditions are performed.

Figure 3:
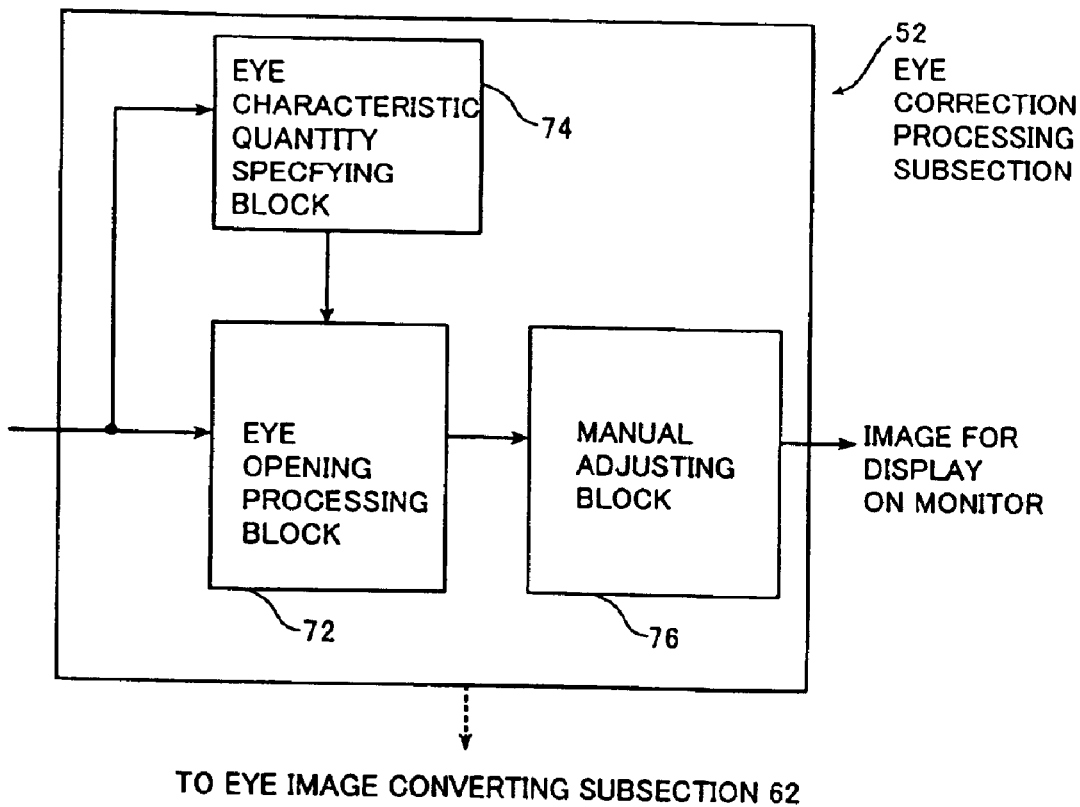
FIG. 3 is a block diagram schematically showing an embodiment of an eye correction processing subsection of the image processing apparatus shown in FIG. 2.

FIG. 3 schematically shows an eye correction processing subsection 52.

As shown in FIG. 3, the eye correction processing subsection 52 comprises an eye opening processing block 72, an eye characteristic quantity specifying block 74 and a manual adjusting block 76. The eye opening processing block 72 is a site which plays a central role of the eye correction processing. There exist many eye processing methods and the eye opening processing block 72 is composed in response thereto as described below. The eye characteristic quantity specifying block 74 is a site which sets information such as a position, a size and the like of the eye which become prerequisite for the eye opening processing. The manual adjusting block 76 is a site in which the operator performs each of the above-described adjustments manually while looking at the display on the monitor 20.

Figure 4:
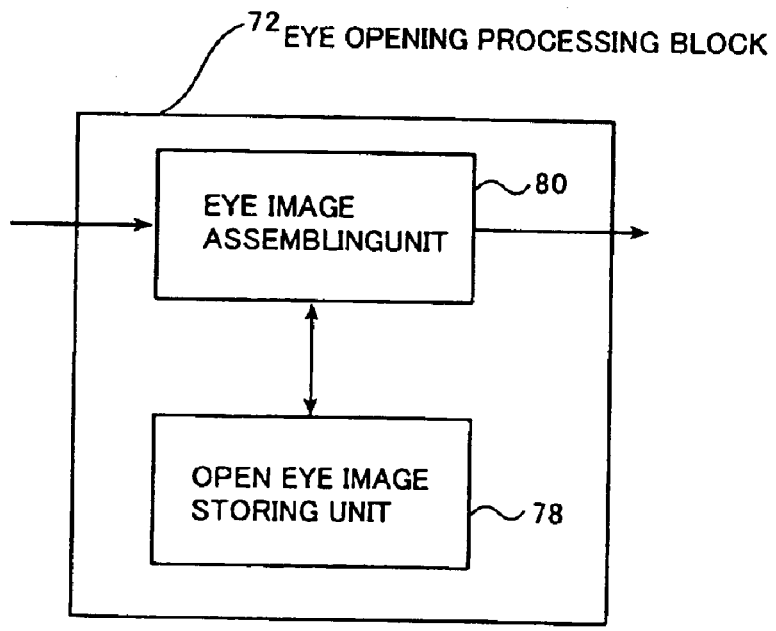
FIG. 4 is a block diagram schematically showing an embodiment of an eye opening processing block which performs a first eye correction processing in the present embodiment of the eye correction processing subsection shown in FIG. 3.

A first eye correction processing method is to composite a closed eye image with an open eye image. On this occasion, the eye opening processing block 72, as shown in FIG. 4, has an open eye image storing unit 78 for storing an open eye image to composite and an eye image compositing unit 80 which actually performs image compositing.

The first eye correction processing method will now be described.

For example, when the open eye image of a same person has been taken in another frame in a roll of film presently under processing, this method intends to composite the closed eye image with the open eye image of interest. To achieve the intention, a roll of film is scanned and the open eye image of the same person is stored in the open eye image storing unit 78, for example, by means of specifying the image by an operator while the operator is looking at the display on the monitor 20. It should be noted that the open eye image to be stored in the open eye image storing unit 78 for use in compositing the closed eye image therewith is not limited to the image of the same person in the same film but the image in another film or the open eye image of a person other than the same person, namely, another person may be permissible.

When the operator is verifying the image for determining the image processing conditions while looking at the display on the monitor 20, if the operator finds the closed eye image, the operator executes eye opening processing at the request of a customer or by the operator's own judgment.

When the eye opening processing starts, firstly the size of the eye is assumed from a size of an eyelid of the closed eye, a distance between left and right eyes, a size of a face and the like in the eye characteristic quantity specifying block 74. Further, the eye characteristic quantity specifying block 74 assumes an angle of an eye portion from a position relation between left and right eyes and an angle of the face. Being based on these information, the eye characteristic quantity specifying block 74 selects the open eye image which nearly conforms to these conditions as the image to composite from the open eye image storing unit 78 and then conforms the size of the thus selected open eye image to these conditions. Further, the angle of the open eye image to composite is conformed to the angle of the eye of the image to be composited.

Furthermore, the eye characteristic specifying block 74 conforms color and density of the open eye image to composite to color and density of a neighboring portion of the eyelid of the closed eye image to be composited.

Figure 5:
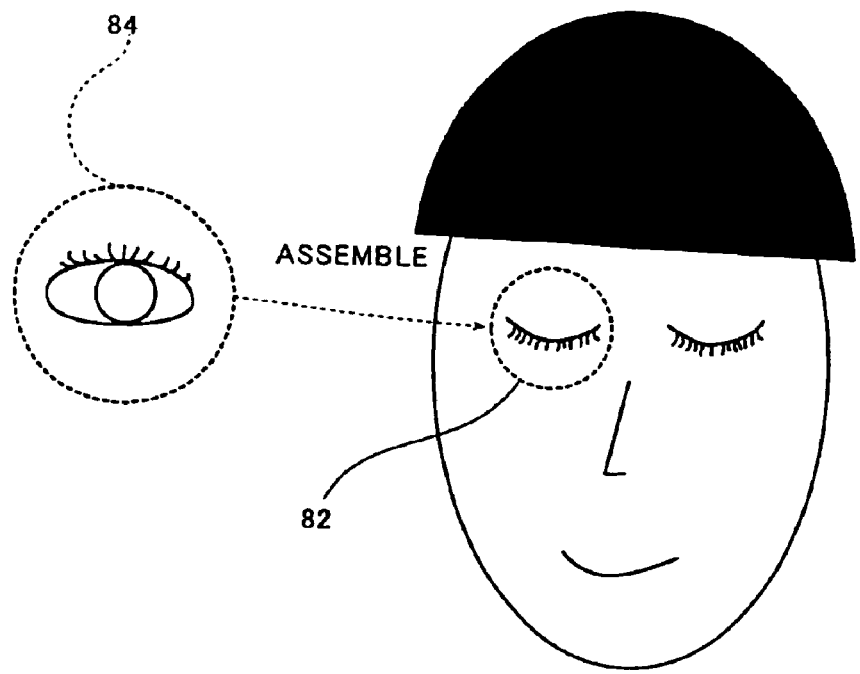
FIG. 5 illustrates an example of a state of eye opening processing in the first eye correction processing according to the present embodiment.

Next, in the eye image compositing unit 80, the closed eye image is composited with the open eye image which has been selected in the above-described manner and processed such that the appropriate compositing can be performed. Actually, as shown in FIG. 5, the neighboring portion 82 of the closed eye is removed and then the neighboring portion 84 of the open eye is inserted in the removed place.

Thereafter, in the manual adjusting block 76, image adjustments are executed on the position, color, density and the like of the eye by issuing commands by the operator while the operator is looking at the display on the monitor 20.

It should be noted that the above processing may automatically be performed by means of computer processing on a portion to which the computer processing is applicable but that all processing steps may manually be performed by the operator while the operator is looking at the monitor 20.

Further, it is permissible that, not only the open eye image to composite is selected from among images in a roll of film which is presently under processing in the above-described manner, but also the open eye image of the same customer or another person who resembles the customer, for example, a brother, sister or the like of the customer, may be retrieved from a data base of past image data by a customer code.

Furthermore, in the above-described compositing, the adjustments for conforming the size, color, density and the like of the open eye image to composite to those of the closed eye image to be composited respectively may automatically be executed in the eye characteristic specifying block 74 based on characteristics such as color and density of the neighboring portion of the eye, positions of left and right eyes, an interval between the both eyes, the size of the closed eye, the size of the face and the like among characteristics of the image to be composited or may manually be executed by the operator based on a menu for changing the size, angle, color, density, aspect ratio and the like of the image to be composited.

A position data or image data of an composited image (a portion thereof) having the open eye which has been composited in the eye image compositing unit 80 of the eye opening processing block 72 of the eye correction processing subsection 52 and adjusted in the manual adjusting block 76 is sent from the eye correction processing subsection 52 of the prescanned data processing section 44 to the image storing subsection 60 and the eye image converting subsection 62 of the fine scanned data processing section 46. It should be noted that, instead of the image data of the composited image having the open eye obtained by the eye correction processing subsection 52, difference of image data of the composited portion of the eyes between before and after the eye correction is performed by the eye correction processing subsection 52 may be sent to the image storing subsection 60 or the eye image converting subsection 62, or the image data having the open eye used for compositing by the eye image compositing unit 80, a parameter used for compositing or an adjusting parameter used for adjustment by the manual adjusting block 76 may be sent thereto.

Next, a second eye correction processing method will be described.

This second eye correction processing is to perform conversion processing based on a feature of a two-dimensional shape.

Specifically, movements of symmetric points are modelled, for example, from a closed eye image, a half-open eye image and an open eye image whereby image conversion is performed morphologically such as in a morphing manner based on the modeled movements of respective portions.

Figure 6:
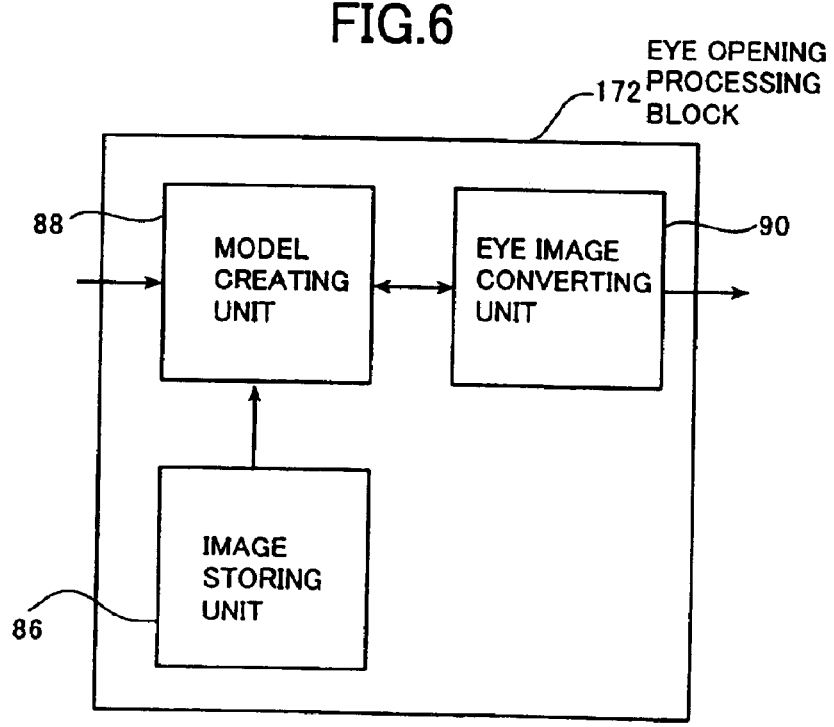
FIG. 6 is a block diagram schematically showing an embodiment of an eye opening processing block which is applied to the eye correction processing subsection shown in FIG. 3 and performs second eye correction processing in the present embodiment.

An eye opening processing block 172 in the second eye correction processing to be used in the eye correction processing subsection 52 shown in FIG. 3 instead of the eye opening processing block 72 shown in FIG. 4 comprises, as shown in FIG. 6, an image storing unit 86, a model creating unit 88 and an eye image converting unit 90.

The image storing unit 86 is a site which stores the closed eye image, the half-opened eye image, the open eye image and the like of the same person or a person other than the same person (namely, another person) that becomes data for modeling a movement of a point on an eyelid. Images selected from among images in a roll of film presently under processing may be stored as image data and, if the image data obtained from the above step are insufficient, past image data of the same customer, another person who, for example, is a brother, sister or a parent of the customer or has a like countenance or the like may be read from the data base.

Figure 7:
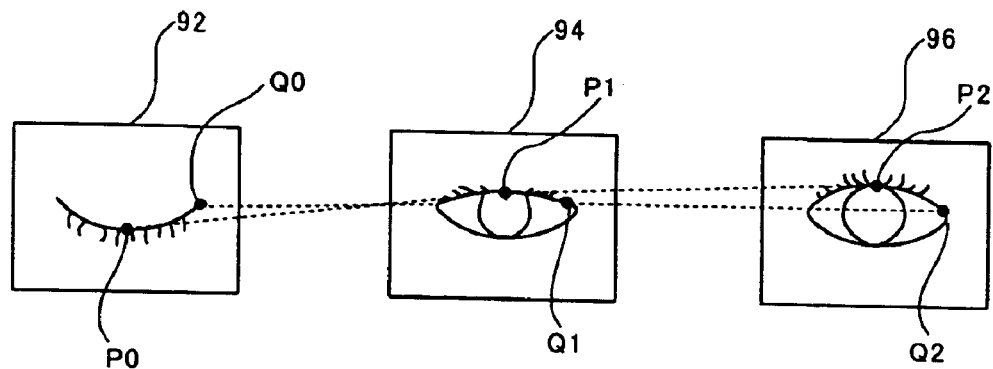
FIG. 7 illustrates an example of eye opening processing in the second eye correction processing according to the embodiment exemplified in FIG. 6.

The model creating unit 88 reads, for example, the closed eye image 92, the half-closed eye image 94 and the open eye image 96 as shown in FIG. 7 of the same person or another person from the image storing unit 86 to create models based on these images. For example, in the closed eye image 92, points P0, Q0 are specified on the eyelid and then tracked as to how these points move. On this occasion, it is postulated that the points P0 and Q0 become P1 and Q1 in the half-opened eye image 94, respectively and P2 and Q2 in the open eye image 9, respectively 6. A state in the middle of movements of such points shown in P0→P1→P2 and Q0→Q1→Q2 is assumed from the above-described points. It is considered that other points on the eyelid also move in the similar way. From this consideration, the shape of the eye during the shift from the above-described closed eye state to the completely open eye state is assumed whereupon, in the case of opening the closed eye, a model showing how each point moves on the eyelid is constructed.

The eye image converting unit 90 converts the eye image in a closed state into the eye image in an open state based on the thus created model. According to such a model, any given state between the closed eye and open eye states can be displayed; the eye can be opened gradually and various countenances in accordance with respective eye opening scenes can be created.

Further, once the model is created and stored, when it occurs that a human image having an eye being closed of the same customer or another person who resembles the customer is processed again, correction of the image having an eye being closed can easily be performed by using such a model.

In such a way, the position data or the image data of the converted image (portion thereof) having the open eye which has been converted by the eye image converting unit 90 of the eye opening processing block 172 of the eye correction processing subsection 52 is sent from the eye correction processing subsection 52 of the prescanned data processing section 44 to the image storing subsection 60 and the eye image converting subsection 62 of the fine scanned data processing section 46. It should be noted that, instead of the image data of the converted image having the open eye, difference of the prescanned data before an eye of the converted image portion of the eye is corrected and the image data after the eye is corrected may be sent thereto, or a plurality of the image data of the open eye used for creating the model by the model creating unit 86, the parameter used for creating the model, the converting parameter used for performing conversion into the open eye by the eye image converting unit 90 or the adjusting parameter used for adjustment by the manual adjusting block 76 may be sent thereto.

Next, a third eye correction processing method will be described.

This method intends to collects data on the image in the closed eye state and the image in the open eye state of the same person or another person, specifies the image in the closed eye state and the image in the open eye state as input data and teacher data respectively, learns a conversion rule, performs image conversion on the basis of the thus learned rule and finally corrects the image in the closed eye state.

Figure 8:
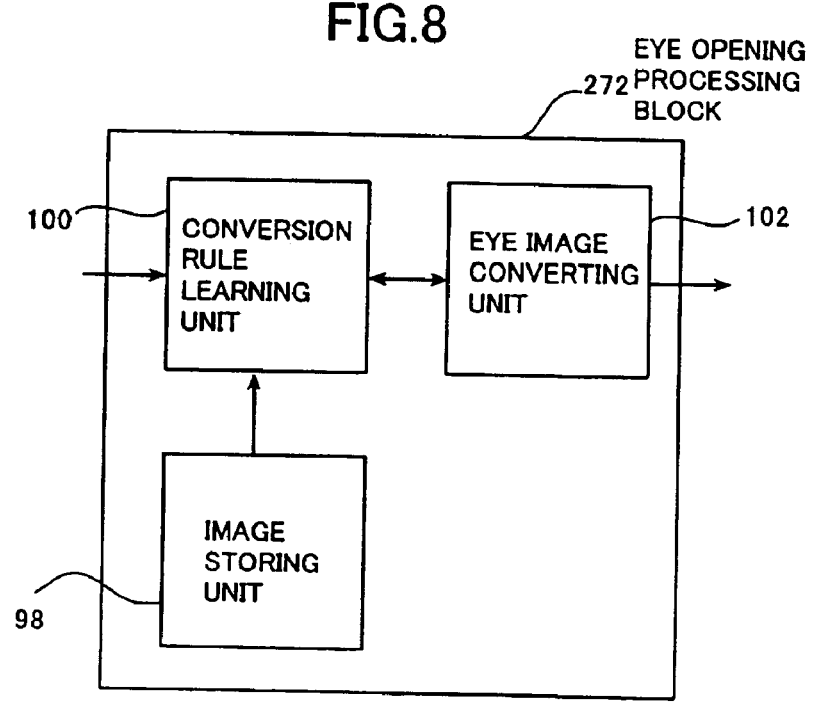
FIG. 8 is a block diagram schematically showing an embodiment of an eye opening processing block which is applied to the eye correction processing subsection shown in FIG. 3 and performs third eye correction processing in the present embodiment.

An eye opening processing block 272 in the third eye correction processing which is applied to the eye correction processing subsection 52 shown in FIG. 3 instead of the eye opening processing block 72 shown in FIG. 4 comprises, as shown in FIG. 8, an image storing unit 98, a conversion rule learning unit 100 and an eye image converting unit 102.

Figure 9:
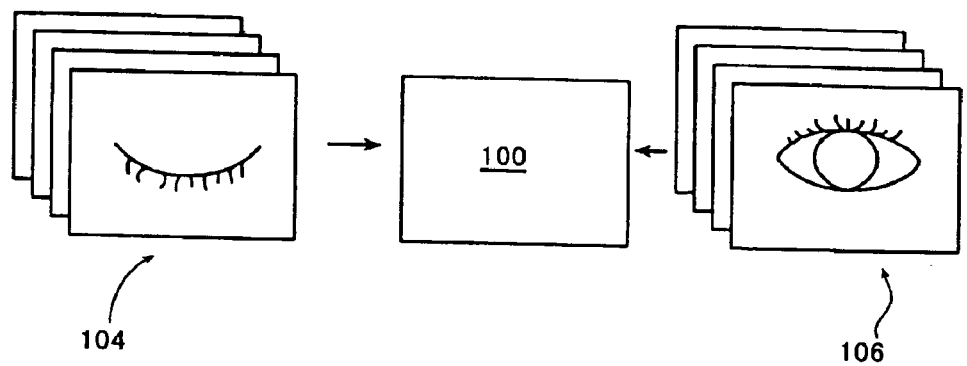
FIG. 9 illustrates an example of eye opening processing in the third eye correction processing according to the embodiment exemplified in FIG. 8.

The image storing unit 98 is a site which stores the image in the closed eye state and the image in the open eye state of the same person or another person. The conversion rule learning unit 100 reads the image in the image storing unit 98, as shown in FIG. 9, specifies an image in a closed eye state 104 and an image in an open eye state 106 of the same person or another person as input data (signal) and teacher data (signal) respectively and learns a conversion rule of interest. To take an example, if a like person appears in a plurality of frames in a roll of film and, moreover, for example, if information showing identity or resemblance of a person in a different frame exist in shooting information and the like, then the image in the open eye state and the image in the closed eye state of the same person of interest or another person who resembles the person can be correlated with each other though such images exist in different frames from each other whereby a rule by which the image in the closed eye state is converted into the image in the open eye state is learned.

The eye image converting unit 102 converts the image in the closed eye state into the image in the open eye state in accordance with the conversion rule established as a result of such learning.

A system of performing the above-described learning is not particularly limited; however, specifically, for example, approximation by neural network, GA (generic algorithm) or high degree polynomial or the like can be considered.

Next, a fourth eye correction processing method will be described.

This method intends to perform image conversion based on the result of dynamic motion analysis of opening/closing movement of an eye and eyelid of a person.

Figure 10:
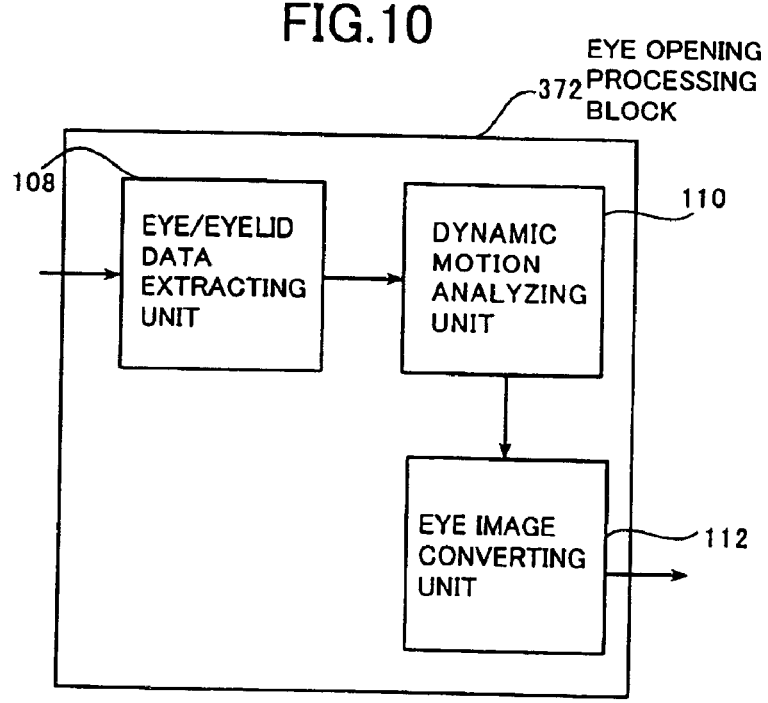
FIG. 10 is a block diagram schematically showing an embodiment of an eye opening processing block which is applied to the eye correction processing subsection shown in FIG. 3 and performs fourth eye correction processing in the present embodiment.

An eye opening processing block 372 in the fourth eye correction processing which is applied to the eye correction processing subsection 52 shown in FIG. 3 instead of the eye opening processing block 72 shown in FIG. 4 comprises, as shown in FIG. 10, an eye/eyelid data extracting unit 108, a dynamic motion analyzing unit 110 and an eye image converting unit 112.

The eye/eyelid data extracting unit 108 is a site which specifies a plurality of points on the eye/eyelid for subsequent dynamic motion analysis.

The dynamic motion analyzing unit 110 is a site which performs the dynamic motion analysis on the points specified by the eye/eyelid data extracting unit 108 and then creates an image in an open eye state.

Specifically, movements of the eyelid and eyelashes are analyzed on the basis of a structure, tissue and position of a muscle which are related with a human eye and movements thereof and then the thus analyzed movements are formulated. The eyelid and eyelashes are recognized from the image in the closed eye state, or the eyelid and eyelashes are specified by operator's commands whereby movement for opening the closed eye is performed based on an equation of motion to obtain the open eye image.

The eye image converting unit 112 may composite the image in the closed eye state with the image in the open eye state obtained by the above step or write a pupil in a space which has been created in accordance with gradual opening of the closed eyelid based on the analysis result.

In the above-described method, it may be considered that it is laborious to formulate the equation of motion; however, once the formulation is established, the open eye image can be obtained in a substantially precise manner only by providing a point on the eyelid.

Position data or image data of the converted image (portion thereof) having the open eye which has been obtained by the eye correction processing subsection 52 applying the eye opening processing blocks 272 and 372 that execute the third and fourth eye correction processing methods respectively is sent, in the same way as in the case in which the position data or image data has been obtained by the eye correction processing subsection 52 applying the eye opening processing blocks 72 and 172 that execute the second eye correction method, from the eye correction processing subsection 52 of the prescanned data processing section 44 to the image storing subsection 60 and the eye image converting subsection 62 of the fine scanned data processing section 46. It should be also noted that, in the same way as described above, instead of the image data of the converted image having the open eye, difference of the image data between before and after the eye correction is performed may be sent thereto, or the parameter used by the conversion rule learning unit 100 or the dynamic motion analyzing unit 110, the converting parameter used by the eye image converting unit 90 or the adjusting parameter used for adjustment by the manual adjusting block 76 may be sent thereto.

In the above-described eye correction processing method, lines of vision of both eyes can be adjusted by enabling a position or shape of a pupil to be adjusted whereupon both of the lines of vision can agree with each other. Moreover, in the above-described eye correction processing method, by specifying a length of eyelashes, a direction of eyelashes, a single-edged eyelid or a double-edged eyelid and the like, the initial image can be converted into a desired image by means of creating the open eye image conforming to these features, performing compositing or other necessary steps. Further, in the above-described eye correction processing method, a finer adjustment becomes possible by allowing a so-called retouch function by which the operator performs the adjustment manually to be provided.

In each of the above-described eye correction processing methods, it is preferable to exert control such that an enlarged image of a neighbor of the eye to be corrected can be displayed on the monitor 20 in the course of executing processing for opening the eye such as at the time of eye opening processing, at the time of retouch or the like in the eye correction processing subsection 52 of the prescanned data processing section 44.

Figure 11:
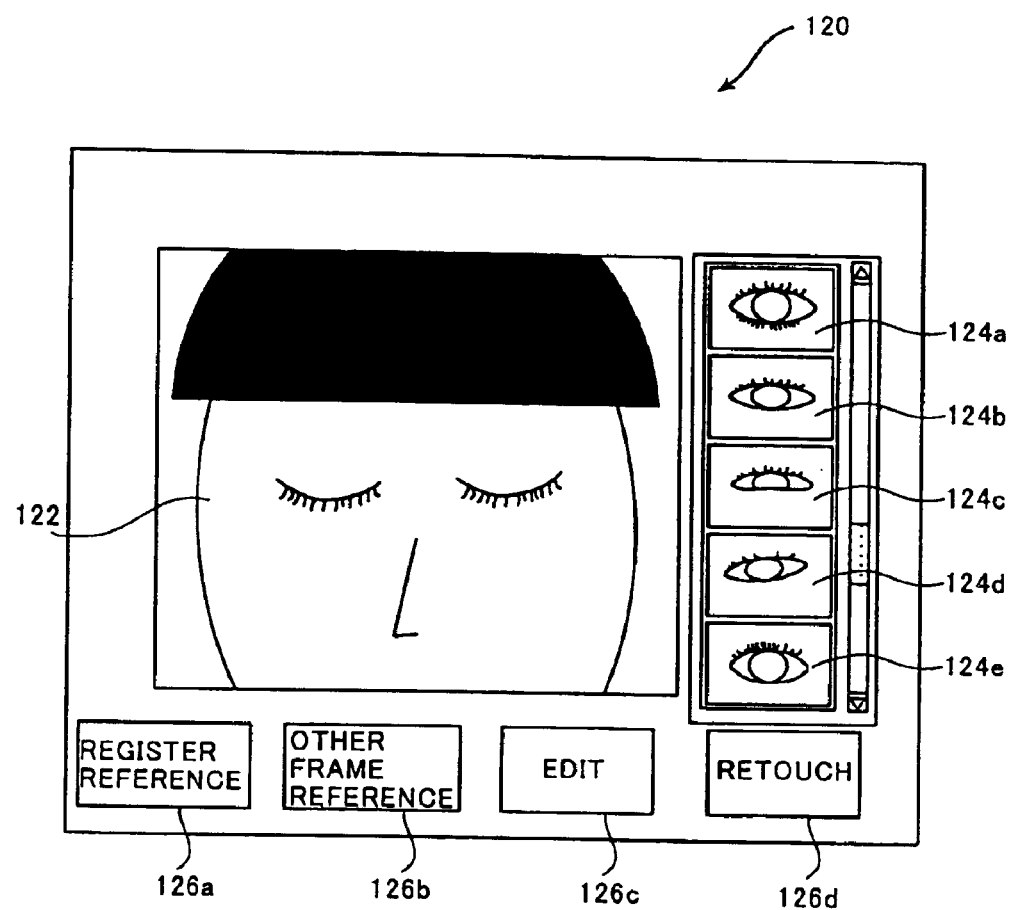
FIG. 11 schematically illustrates an example of a display screen of an image display device that performs compsiting processing which executes an image processing method according to the present invention.

FIG. 11 shows an example of a display screen 120 executing compositing processing by the eye correction processing subsection 52. On the display screen 120 shown in FIG. 11, the enlarged image 122 of the neighboring portion of the eye to be corrected of the person shown in FIG. 5 is shown; in the right side of FIG. 11, five types of representative samples of the open eyes 124a, 124b, 124c, 124d and 124e are shown in a direction from top to bottom; in the lower side of FIG. 11, selection buttons such as a register reference button 126a, another frame reference button 126b, an editing button 126c, a retouch button 126d and the like are shown as GUI (graphic user interface) in a direction from left to right.

In such a way, when the eye opening processing is performed, the enlarged image of the neighbor of the eye to be corrected can be represented on the display screen of the monitor 20; however, an enlarged display area of the neighboring portion of the eye on the display screen 120 may be specified or be automatically set on the basis of a size of a face after the face is extracted from an image in a frame (frame image).

Further, by pressing the register reference button 126a down, as shown in FIG. 11, representative eye candidates (samples of open eyes 124a to 124e) which have preliminarily been registered are represented on the display screen 120 and then an appropriate sample of the open eye to composite can be selected. It should be noted that an arrangement may be made such that a new sample of eye can be registered to a list of the preliminarily registered samples of the open eyes or a registered sample of eye can be removed from the list.

Furthermore, it should be noted that, when the open eye is composited, the eye to composite may automatically be adjusted on the basis of information of the neighbor of the eye to be composited, for example, the color or density of the skin, the size of the eye and the like.

Next, by pressing other frame reference button 126b down, other frame of the same scene (subject) can be displayed enabling it to be referenced whereby an eye can be extracted from the image having an open eye of the same person or another person who resembles the person and composited to the closed eye to be corrected.

Further, by means of the editing button 126c, the size, angle, color or aspect ratio of the eye, presence or absence of the fold in the eyelid (the single or double-edged eyelid), the length or direction of the eyelashes, the position of the pupil or the like can be changed and the line of vision and the like can be adjusted, in relation to one eye or both eyes.

Furthermore, by means of the retouch button 126d, retouch work (stipple, draft, coloring or the like) can be performed.

In such a way, the position data or image data of the composited image having the open eye or converted image (portion thereof) obtained by the eye correction processing subsection 52 which executes each of the above-described eye correction methods, difference of the image data between before and after the eye correction is performed, the image data having the open eye to be used for compositing or converting, the learning parameter, the analyzing parameter, the converting parameter or the adjusting parameter is sent from the eye correction processing subsection 52 of the prescanned data processing section 44 to the image storing subsection 60 and the eye image converting subsection 62 of the fine scanned data processing section 46 and stored therein.

On the other hand, in the fine scanned data processing section 46, the eye image converting subsection 62 performs processing on the fine scanned data which has been subjected to the expansion/compression by the expansion/compression processing subsection 56 and the color density gradation conversion by the gradation converting subsection 58 using the position data or image data of the composited image having the open eye or the converted image (portion thereof), difference of the image data between before and after the eye correction is performed, image data of the open eye to be used in compositing or converting, the learning parameter, the analyzing parameter, the converting parameter, the adjusting parameter or the like which has been stored in and read from the image storing subsection 60 whereby the closed eye image is made to the appropriate open eye which has previously been set.

On this occasion, if the position data or image data of the composited image of the open eye or converted image is stored in the image storing subsection 60, since such position data or image data is based on the prescanned data at a low resolution, the eye image converting subsection 62 first performs processing such as interpolating or the like so that it has the same resolution as the fine scanned data and agrees with the position data of the neighbor of the eye the fine scanned data of which is to be corrected and then performs compositing processing or converting processing of the eye correction image data thereby correcting the closed eye into the open eye.

Next, if the position data of the eye correction image and the difference of the image data between before and after the eye correction is performed are stored in the image storing subsection 60, since such position data or difference data is based on the prescanned data at a low resolution, the eye image converting subsection 62 first performs processing such as interpolation or the like so that it has the same resolution as the fine scanned data and agrees with the position data of the neighbor of the eye the fine scanned data of which is to be corrected and then performs adding processing of difference data thereby correcting the closed eye into the open eye. It should be noted that, since the difference data is 0 except for the neighbor of the eye to be corrected, it is not limited to the neighbor of the eye to be corrected, but it may be obtained on the basis of the entire image in a frame (frame image) and, in doing such a way, processing by the eye image converting subsection 62 can be simplified.

Further, if the image data of the open eye to be used for performing compositing or converting, the learning parameter, the analyzing parameter, the converting parameter or the adjusting parameter is stored in the image storing subsection 60, by allowing the eye image converting subsection 62 to have the substantially same construction as the eye correction processing subsection 52, it performs the similar eye opening processing as in the eye correction subsection 52 whereupon the closed eye can be corrected into the open eye. It is of course needless to say that, if the image data of the open eye is the prescanned data at a low resolution, the eye image converting subsection 62 performs processing such as interpolation or the like to have the same resolution as the fine scanned data.

It should be noted that the data stored in the image storing subsection 60 or the construction or function of the eye image converting subsection 62 is not limited in any particular way but may be appropriately set in accordance with type or method of eye opening processing by the eye correction processing subsection 52 or data to be obtained.

The fine scanned data in which the closed eye has been corrected into the open eye by the above-described way is subjected to sharpness processing by the sharpness processing subsection 64 and subsequent conversion processing for creating output device data by the color reproduction converting subsection 66 and, as output image data corresponding to an output device, is sent to the printer 16 for being outputted as a color print or the image data input/output device 40 for being recorded on the media or distributed via communication device.

Furthermore, in any of the above-described methods from the first to the fourth, if one eye of the image to be adjusted is open, information of the eye of interest can be utilized. As information of the eye image, features of the eye and the neighbor thereof, namely, the color and size of the pupil of the open eye, the length of the eyelashes, colors of skin of the eyelid and the neighbor thereof, the type of the single or double-edged eyelid, the position of the eye, the size and shape of the eye and the like are considered. In correcting the eye in the closed state into the eye in the open state, the eye correction processing for opening the closed eye can be performed in a simpler, more precise manner by utilizing the above-described information, for example, by allowing both eyes to have the same color of the pupil, allowing the length of eye lashes of both eyes to be the same, allowing both eyes to have the same size and the like.

As described above, in the eye correction processing, when one eye is open, it is extremely effective to utilize features of the eye of interest and the neighbor thereof.

On this occasion, if it is intended that the eye correction processing is performed more easily, one eye in the open state out of the two eyes is inverted and composited on the other eye in the closed state.

According to the embodiments described above, it is possible to convert the image in the closed eye state into the image in the open eye state in an easy manner thereby correcting a failure of photographing.

Further, the present invention can be utilized for processing such as changing an open mouth into a closed mouth, turning a child's face which happened to be turned aside at the time of shooting to look straight and the like.

Furthermore, the present invention may be applied to the animals.

While the image processing method and apparatus of the present invention have been described above in detail by exemplifying various embodiments, it should be noted that the invention is by no means limited to the foregoing embodiments and various improvements and modifications may of course be made without departing from the scope and spirit of the invention.

As described above, according to the present invention, processing of opening the eye is performed on the human image in the closed eye state whereby the failure created at the time of shooting is corrected to obtain the image in the open eye state.

What is claimed is:

1. An image processing method, comprising the steps of:
   performing preset image processing on input digital image data; and
   outputting processed image data as output image data, wherein said preset image processing includes digital composite processing for compositing an eye image in an open state on a closed eye image in a human image having an eye in a closed state, and
   wherein said digital composite processing includes adjusting a size and angle of the eye, colors and densities of an eyelid, a pupil and neighbor of the eye in an image to composite so as to conform to those in an image to be composited.

2. The image processing method according to claim 1, wherein said digital composite processing composites an open eye image of a same person on said closed eye image.

3. The image processing method according to claim 1, wherein said digital composite processing composites an open eye image of a person other than a same person to said closed eye image.

4. The image processing method according to claim 1, wherein said digital composite processing composites on said closed eye an eye image selected from a plurality of samples of open eye images which have preliminarily been prepared.

5. The image processing method according to claim 1, wherein said adjusting step is performed automatically based on one or more characteristics of image characteristics of said image to be composited including a color and density of the neighbor of the eye, a position of each eye, a distance between both eyes, a size of the eye and a size of a face.

6. The image processing method according to claim 1, wherein said adjusting step is performed manually by an operator based on a menu which changes a size, angle, color, density and aspect ratio of the eye of said image to composite.

7. The image processing method according to claim 1, wherein said eye correction processing further comprises a retouch function.

8. The image processing method according to claim 1, wherein said eye correction processing in correcting the closed eye image when only one eye is closed utilizes characteristics of open eye and neighbor thereof.

9. The image processing method according to claim 8, wherein, as the characteristics of the neighbor, at least one or more information of a color and size of a pupil, a length of eyelashes, a color of skin of an eyelid and the neighbor of the eye, a single-edged eyelid or a double-edged eyelid, a position of the eye and the size and shape of the eye are utilized.

10. The image processing method according to claim 1, wherein a position or a shape of a pupil can be changed to be capable of adjusting a line of vision by both eyes.

11. An image processing method, comprising the steps of:
    performing preset digital image processing on input digital image data; and
    outputting processed image data as output image data, wherein
    said preset image processing includes eye correction processing for correcting a closed eye image in a human image having an eye in a closed state into an eye image in an open state, and
    wherein said eye correction processing is performed by the steps of:
    comparing the eye image in the closed state and the eye image in the open state with each other;
    assuming movement of a point on an eyelid based on a characteristic of a shape of the eye image; and
    opening a closed eye based on the thus assumed movement.

12. The image processing method according to claim 11, wherein a degree of opening the closed eye is adjustable in said eye correction processing.

13. The image processing method according to claim 11, wherein the eye image in said closed state is adjustable into the eye image in a predetermined open state by specifying a length of eyelashes, a direction of the eyelashes, a single-edged eyelid or a double-edged eyelid.

14. An image method, comprising the steps of:
    performing preset digital image processing on input digital image data; and
    outputting processed image data as output image data, wherein said preset image processing comprises eye correction processing for correcting a closed eye image in a human image having an eye in a closed state into an eye image in an open state, and wherein said eye correction processing includes the steps of:

setting the eye image in the closed state as an input signal;

setting the eye image in the open state as a teacher signal;

learning an image conversion from a closed eye to a open eye; and opening the closed eye based on the thus learned image conversion.

15. An image processing apparatus for receiving digital image data from an image input device, performing preset image processing on the inputted digital image data and outputting processed image data as output image data to an image output device, comprising an eye correction processing device which composites an eye image in an open state on a closed eye image in a human image having an eye in a closed state so as to correct said closed eye image into said eye image in the open state, wherein said eye correction processing device adjusts a size and angle of the eye, colors and densities of an eyelid, a pupil and neighbor of the eye in an image to composite so as to conform to those in an image to be composited.

16. The image processing apparatus according to claim 15, further comprising an image display device, which controls such that an enlarged image of a neighbor of the eye can be displayed on said image display device while said eye correction processing device performs said eye correction processing for opening a closed eye.

17. An image processing apparatus, comprising:

an input device for receiving digital image data;

processing means for performing preset digital image processing on input digital image data; and an output device for outputting processed image data as output image data, wherein said processing means comprises an eye correction processing device correcting a closed eye image in a human image having an eye in a closed state into an eye image in an open state, and wherein said eye correction processing device includes:

a comparing processing unit for comparing the eye image in the closed state and the eye image in the open state with each other;

an assuming processing unit for assuming movement of a point on an eyelid based on a characteristic of a shape of the eye image; and an opening processing unit for opening a closed eye based on the thus assumed movement.

18. An image processing apparatus, comprising:

an input device receiving digital image data;

processing means for performing preset digital image processing on input digital image data; and an output device outputting processed image data as output image data, wherein said processing means comprises an eye correction processing device correcting a closed eye image in a human image having an eye in a closed state into an eye image in an open state, said eye correction processing device includes:

a setting unit setting the eye image in the closed state as an input signal and setting the eye image in the open state as a teacher signal, a learning processing unit learning an image conversion from a closed eye to a open eye, and opening the closed eye based on the thus learned image conversion.

19. An image processing method, comprising the steps of:

performing digital image processing on input digital image data; and outputting processed image data as output image data, wherein said digital image processing includes digital eye correction processing for correcting a closed eye image in a human image having an eye in a closed state into an eye image in an open state, and wherein said digital image processing includes the steps of:

analyzing dynamic motion of opening and closing movement of the eye and eyelid based on said closed eye image data;

creating said eye image data in the open state based on said dynamic motion analysis;

correcting said closed eye image data by using said eye image data in the open state.

20. The image processing method according to claim 19, wherein said analyzing step includes the steps of specifying a plurality of points on the eye and eyelid based on the said closed eye image data; and performing said dynamic motion analysis on said plurality points.

21. The image processing method according to claim 20, wherein said analyzing step includes analyzing movement of said eyelid based on a structure, tissue and position of a muscle being related with the human eye.

* * * * *